United States Patent
Hu et al.

(10) Patent No.: US 11,817,801 B2
(45) Date of Patent: Nov. 14, 2023

(54) MOTOR SPEED CONTROLLER AND SPEED CONTROL SYSTEM

(71) Applicant: Johnson Controls Tyco IP Holdings LLP, Milwaukee, WI (US)

(72) Inventors: Menghua Hu, Wuxi (CN); Jinbao Li, Changzhou (CN); Yufeng Zhou, Wuxi (CN); Shuqing Wang, Gushi Xian (CN); Zuolin Ren, Wuxi (CN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 488 days.

(21) Appl. No.: 16/726,062

(22) Filed: Dec. 23, 2019

(65) Prior Publication Data

US 2020/0204095 A1 Jun. 25, 2020

(30) Foreign Application Priority Data

Dec. 25, 2018 (CN) .......................... 201822193407.7

(51) Int. Cl.
*H02P 1/00* (2006.01)
*H02P 7/06* (2006.01)
*H02P 7/29* (2016.01)

(52) U.S. Cl.
CPC ................ *H02P 7/063* (2013.01); *H02P 7/29* (2013.01)

(58) Field of Classification Search
CPC .................................... H02P 7/063; H02P 7/29
See application file for complete search history.

(56) References Cited

U.S. PATENT DOCUMENTS

| | | | | |
|---|---|---|---|---|
| 4,749,927 A | | 6/1988 | Rodal et al. | |
| 5,023,527 A | * | 6/1991 | Erdman | G05D 23/19 318/400.03 |
| 5,068,582 A | * | 11/1991 | Scott | H02P 6/182 318/400.11 |
| 5,157,435 A | * | 10/1992 | Min | G02B 7/32 250/201.4 |
| 5,218,276 A | * | 6/1993 | Yeom | A63H 30/04 318/16 |
| 5,579,194 A | * | 11/1996 | Mackenzie | H02H 6/005 361/28 |
| 5,739,650 A | * | 4/1998 | Kimura | H02P 6/187 318/722 |
| 5,739,651 A | * | 4/1998 | Miyazawa | H02P 6/15 388/813 |

(Continued)

*Primary Examiner* — Bickey Dhakal
*Assistant Examiner* — Gabriel Agared
(74) *Attorney, Agent, or Firm* — Foley & Lardner LLP (57) ABSTRACT

An electric motor speed controller includes a processor connected to the following terminals, a base voltage terminal receiving a base voltage, a first voltage terminal provided with a constant voltage, and a second voltage terminal receiving a first motor coil voltage from the processor, and a third voltage terminal receiving a second motor coil voltage from the processor. The processor provides a first control period having the second motor coil voltage be zero and a second control period having the first motor coil voltage be zero. The processor determines the motor speed by controlling a difference between a first time period in the first control period and a second time period in the second control period. The first time period corresponds to a first output voltage increase and the second time period corresponds to a second output voltage increase.

17 Claims, 4 Drawing Sheets

(56) References Cited

U.S. PATENT DOCUMENTS

| | | | |
|---|---|---|---|
| 6,153,989 A * | 11/2000 | Kardash | H02P 6/24 |
| | | | 318/245 |
| 6,650,072 B2 | 11/2003 | Harlan | |
| 2004/0070356 A1* | 4/2004 | Masino | H02P 6/16 |
| | | | 318/400.35 |

* cited by examiner

MOTOR SPEED CONTROLLER AND SPEED CONTROL SYSTEM

CROSS-REFERENCE TO RELATED PATENT APPLICATIONS

The present application claims priority to and the benefit of Chinese Patent Application No. 201822193407.7, filed Dec. 25, 2018, which is incorporated herein by reference in its entirety.

BACKGROUND

The present disclosure relates generally to speed controllers.

Operations of an electric motor or an actuator driven by an electric motor are often controlled using a speed controller. Conventional speed controllers receive sensor measurements of actual speeds of the electric motor and use various control methods (e.g., proportional-integral-derivative, linear quadratic regulator, etc.) to determine outputs of voltage or current or both for achieving a target speed. In other examples, speed controllers may also receive measurements of the amount of rotation of the motor, and achieve a target position.

Conventionally an actuator used in HVAC systems can turn on or off certain components for regulating flow. The actuator may be driven by a motor, such as a brushless direct current (BLDC) motor or a regular direct current (DC) motor. In a BLDC motor, three Hall effect sensors are often integrated to measure the rotation speeds. In a brushed DC motor, a magnetic ring may be installed and similarly use Hall effect sensors to measure the rotation speeds. These speed sensors, however, increases the system complexity and production costs.

When a voltage is applied to a DC motor under a certain load, the DC motor can operate at an equilibrium speed. Traditionally, if the equilibrium speed is different from a target speed and if there is no speed sensor to measure the actual operation speed of the motor, it would be difficult for a speed controller to determine what voltage change is necessary to realize the target speed.

SUMMARY

This disclosure provides a speed controller and speed control system for controlling speeds of an electrical motor without using a speed measurement sensor. In some embodiments, the speed controller may be used to control actuators in a heating, ventilating, or air conditioning (HVAC) systems. For example, the speed controller may control the speed of a direct current motor driving an actuator installed in an HVAC system. Unlike traditional speed controllers that rely on sensor measurements of the motor's rotation speeds to complete a control feedback loop, the disclosed speed controller determines the motor speeds by controlling certain time characteristics of driving signals, for example, with an integrator circuit. As such, rotation speed sensors, such as Hall sensors, are not required. This reduces the complexity of the speed control system as well as the related manufacturing costs.

In a first general aspect, a speed controller for determining and controlling operation speeds of a motor includes a processor operable to send control signals and receive feedback signals. The speed controller includes a base voltage terminal electrically connected to the processor. The base voltage terminal receives a base voltage. A first voltage terminal is electrically connected to the processor and provided with a constant voltage. A second voltage terminal is electrically connected to the processor and receives a first motor coil voltage determined by the processor. A third voltage terminal is electrically connected to the processor and receives a second motor coil voltage determined by the processor. The second motor coil voltage may be provided to measure the motor coil current. The processor provides a first control period having the second motor coil voltage of the third voltage terminal be zero and a second control period having the first motor coil voltage of the second voltage terminal be zero. The processor determines a rotation speed of the motor by controlling a value difference between a first time period in the first control period and a second time period in the second control period. The first time period corresponds to a first increase in an output voltage. The second time period corresponds to a second increase in the output voltage.

In some embodiments, the processor receives a feedback signal produced from the output voltage.

In some embodiments, the output voltage $U_o$, the base voltage $U_+$, the constant voltage $U_1$, the first motor coil voltage $U_2$, and the second motor coil voltage $U_3$ satisfy the following relationship:

$$U_O = U_+ + \frac{U_+}{C_F}\int\left(\frac{1}{R_1} + \frac{1}{R_2} + \frac{1}{R_3}\right)dt - \frac{1}{C_F}\int\left(\frac{U_1}{R_1} + \frac{U_2}{R_2} + \frac{U_3}{R_3}\right)dt$$

In the above relationship, $C_F$ is a value of a capacitor in an amplifier integrator circuit and $R_1$, $R_2$, and $R_3$ are values of respective resistors between the first voltage terminal, the second voltage terminal and the third voltage terminal and the amplifier integrator circuit.

In some specific embodiments, a value $R_S$ of armature and brush resistance of the motor and a value $R_{Sense}$ of a resistor sensor measuring motor coil current of the motor satisfy the following relationship:

$$R_s = \frac{R_2 R_{Sense}}{R_3}$$

In yet some other specific embodiments, a first time difference between the first control period $T_1$ and the first time period $t_1$ is the same as a second time difference between the second control period $T_2$ and the second time period $t_3$, the first time difference denoted $t_0$ and the second time difference denoted $t_2$. The rotation speed n of the motor is proportional to the constant value difference between $t_3$ and $t_1$.

In some embodiments, the rotation speed n and the constant value difference between $t_3$ and $t_1$ satisfy the following relationship:

$$n = \frac{R_2}{t_0 K_E}\left[U_+\left(\frac{1}{R_1} + \frac{1}{R_2} + \frac{1}{R_3}\right) - \frac{U_1}{R_1}\right](t_1 - t_3)$$

In the above relationship, $K_E$ is a constant of the back electromotive force of the motor.

In some specific embodiments, the base voltage $U_+$ is set at zero, the constant voltage $U_1$ is set at 5 V, the first motor coil voltage $U_2$ is greater than zero, and the second motor coil voltage $U_3$ is set at zero during the first time difference $t_0$.

In yet some other specific embodiments, the base voltage $U_+$ is set at 0.5 V, the constant voltage $U_1$ is set at 5 V, the first motor coil voltage $U_2$ is set at zero, and the second motor coil voltage $U_3$ is set at zero during the first time period $t_1$.

In some specific embodiments, the processor sends a command voltage of 5 V to an input terminal IN1 of the speed controller during the first time period $t_1$.

In some embodiments, the base voltage $U_+$ is set at zero, the constant voltage $U_1$ is set at 5 V, the first motor coil voltage $U_2$ is set at zero, and the second motor coil voltage $U_3$ is greater than zero during the second time difference $t_2$.

In some embodiments, the base voltage $U_+$ is set at 0.5 V, the constant voltage $U_1$ is set at 5 V, the first motor coil voltage $U_2$ is set at zero, and the second motor coil voltage $U_3$ is set at zero during the second time period $t_3$.

In some specific embodiments, the processor sends a command voltage of 5 V to the input terminal IN1 of the speed controller during the second time period $t_3$.

In some embodiments, the motor is a brushed direct current motor.

In some specific embodiments, the processor provides a pulse width modulation signal to drive the motor.

In a second general aspect, an actuator control system includes a motor operable to move an actuator and a speed controller determining and controlling the a rotation speed of the motor. The speed controller includes a processor operable to send control signals and receive feedback signals. The speed controller further includes the following terminals: a base voltage terminal electrically connected to the processor and receiving a base voltage; a first voltage terminal electrically connected to the processor and provided with a constant voltage; a second voltage terminal electrically connected to the processor and receiving a first motor coil voltage determined by the processor; and a third voltage terminal electrically connected to the processor and receiving a second motor coil voltage determined by the processor. The processor provides a first control period having the second motor coil voltage of the third voltage terminal be zero and a second control period having the first motor coil voltage of the second voltage terminal be zero. The processor determines a rotation speed of the motor by maintaining a constant value difference between a first time period in the first control period and a second time period in the second control period. The first time period corresponds to a first increase in an output voltage. The second time period corresponds to a second increase in the output voltage.

In some embodiments, the processor includes an integrator circuit and a comparator circuit, and the processor receives a feedback signal produced from the output voltage. The output voltage $U_o$, the base voltage $U_+$, the constant voltage $U_1$, the first motor coil voltage $U_2$, and the second motor coil voltage $U_3$ satisfy the following relationship:

$$U_O = U_+ + \frac{U_+}{C_F}\int\left(\frac{1}{R_1}+\frac{1}{R_2}+\frac{1}{R_3}\right)dt - \frac{1}{C_F}\int\left(\frac{U_1}{R_1}+\frac{U_2}{R_2}+\frac{U_3}{R_3}\right)dt$$

wherein $C_F$ is a value of a capacitor in an amplifier integrator circuit and $R_1$, $R_2$, and $R_3$ are values of respective resistors between the first voltage terminal, the second voltage terminal and the third voltage terminal and the amplifier integrator circuit.

In some specific embodiments, a value $R_S$ of armature and brush resistance of the motor and a value $R_{Sense}$ of a resistor sensor measuring motor coil current of the motor satisfy the following relationship:

$$R_s = \frac{R_2 R_{Sense}}{R_3}$$

In yet some specific embodiments, a first time difference between the first control period T and the first time period $t_1$ is the same as a second time difference between the second control period $T_2$ and the second time period $t_3$, the first time difference denoted $t_0$ and the second time difference denoted $t_2$; and wherein the rotation speed n of the motor is proportional to the constant value difference between $t_3$ and $t_1$.

In some specific embodiments, the motor is a direct current brush motor and the processor provides a pulse width modulation signal to drive the motor.

DETAILED DESCRIPTION

An electric motor speed controller is disclosed herein. In some embodiments, the speed controller includes an integrator circuit and a comparator circuit. The speed controller does not require rotation speed sensors that monitor the rotation speeds of the electric motor and thus reduces the complexity of the controller and the related component costs. The speed controller can determine the motor speed using the integrator circuit and the comparator circuit. Such speed controller can widely be adopted in systems that have electric motors, such as HVAC systems that have actuators driven by electric motors. HVAC actuators are used to operate a wide variety of HVAC components such as air dampers, fluid valves, air handling units, and other components that are typically used in HVAC systems. To precisely control HVAC actuators, the rotation speeds of the driving motors must be accurately measured or determined. This disclosure provides a controller device, system, and method for determining the motor speed without the use of rotation speed sensors.

Figure 1:
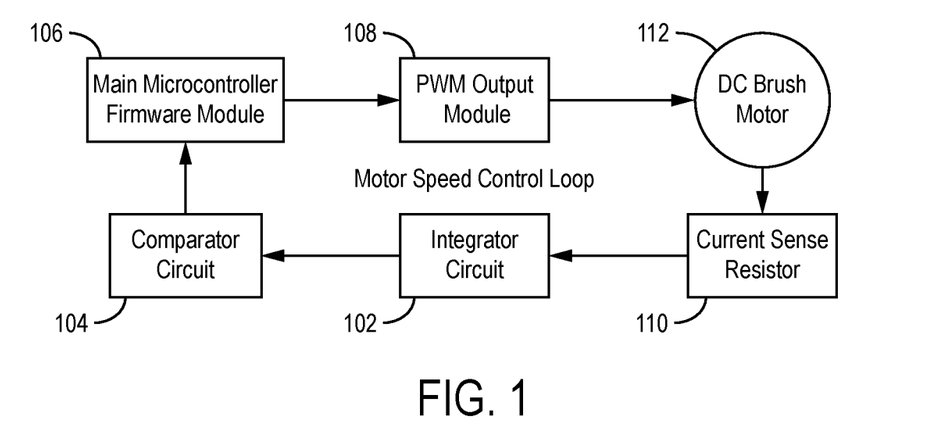
FIG. 1 is a schematic diagram of an example control loop for an electric motor.

Referring now to FIG. 1, a schematic diagram of an example control loop 100 for an electric motor 112 is shown, according to some embodiment. At a high level, the disclosed speed controller, including the control loop 100, uses a comparator circuit 102, an integrator circuit 104, or equivalent operational amplifiers to produce a proportional relationship between certain time characteristics and the motor speed. A main microcontroller firmware module 106 provides control signals to a pulse width modulation (PWM)

output module 108. The PWM output module 108 sends regulated power to the electric motor 112 (e.g., a brushed DC motor). A current sense resistor 110 provides values of the motor coil current to The integrator circuit 102. The integrator circuit 102 is connected to the comparator circuit 104. The main microcontroller firmware module 106 receives the output from the comparator circuit 104 and determines the control signals based on the feedback.

The main microcontroller firmware module 106 can be a processor, a central processing unit, or any integrated circuit chips programmable to process data and output signals. In some embodiments, the main microcontroller firmware module 106 is a general motor control unit (MCU). In other embodiments, the main microcontroller firmware module 106 may be integrated with the PWM output module 108, the integrator circuit 102, or the comparator circuit 104 103, or a combination of any or all of these components. The overall integrated circuit may generally be referred to as an MCU.

The PWM output module 108 receives control signals from the main microcontroller firmware module 106 in order to determine a duty level in response to specific loading conditions. The PWM output module 108 sends a pulsing signal to the electric motor 112. The input power applied to the electric motor 112 can be controlled by varying the width of the pulses and the corresponding average DC voltage. In some implementations, the PWM output module 108 may include timer chips for producing the pulse width modulation signal at a fixed frequency. In other implementations, the PWM output module 108 may rely on the control signals from the main microcontroller firmware module 106 to determine the frequency and width of the pulse width modulation signal. The PWM output module 108 may operate under both modes, for example, under a fixed frequency that can be overridden by commands from the main microcontroller firmware module 106.

In some embodiments, the electric motor 112 is a brushed DC motor used in actuators in HVAC systems. For example, actuators that are driven by a DC motor, such as a damper actuator, a valve actuator, a fan actuator, a pump actuator, or any other type of actuator may include one or more brushed DC motors. Although FIG. 1 illustrates the use of a brushed motor, in other embodiments, brushless motors may be used with modifications in the MCU and the PWM output module 108.

The integrator circuit 102 can output an integral of the input signal over a frequency range based on the circuit time constant and the bandwidth of the amplifier. The integrator circuit 102 may be an operational amplifier integrator. As such, the integrator circuit 102 outputs a voltage proportional to the input voltage integrated over time. In some embodiments, the integrator circuit 102 may be an off-the-shelf component separate from the main microcontroller firmware module 106. In other embodiments, the integrator circuit 102 may be integrated with the main microcontroller firmware module 106.

The comparator circuit 104 compares two voltages or currents and outputs a digital signal indicating the larger signal. The comparator circuit 104 may include a high-gain differential amplifier and may measure and digitize analog signals, such as analog-to-digital converters. The comparator circuit 104 may be an operational amplifier comparator. As such, the comparator circuit 104 outputs a voltage proportional to the larger input voltage. In some embodiments, the comparator circuit 104 may be an off-the-shelf component separate from the main microcontroller firmware module 106. In other embodiments, the comparator circuit 104 may be integrated with the main microcontroller firmware module 106.

Figure 2:
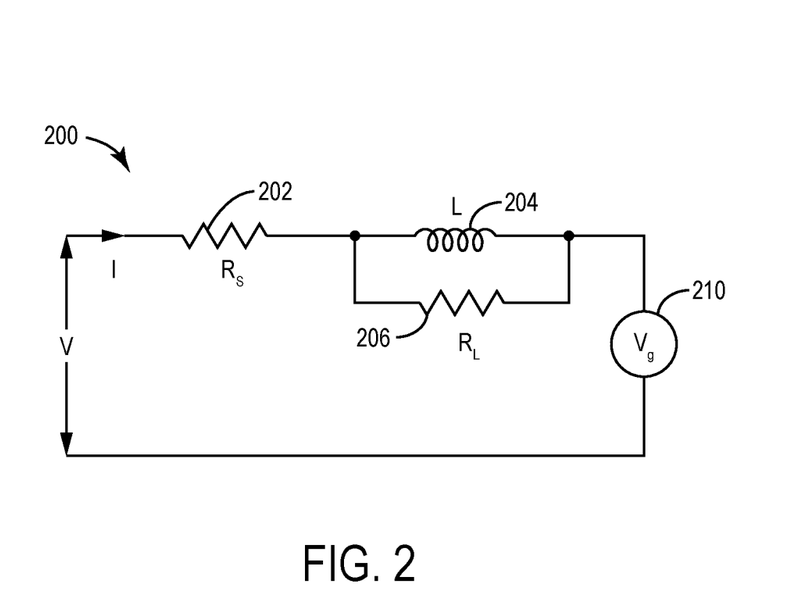
FIG. 2 is a schematic diagram of a circuit having equivalent components for an electric motor.

Turning now to FIG. 2, a schematic diagram of a circuit 200 that includes equivalent components for a motor 210 (e.g., an electric brushed DC motor). When a voltage V is applied to the motor 210, the motor 210 will reach an equilibrium state producing a torque balancing against a load at a steady speed (e.g., at n rpm). In the diagram, the electric current I travels through a motor resistance $R_S$ represented by a resistor 202, a winding inductance L represented by an inductor 204, and a counter-electromotive force component (e.g., back EMF). The magnetic losses $R_L$ are represented by a resistor 206.

The MCU of FIG. 1 will operate under the following assumptions. First, magnetic losses are considered to be infinitely large and can be excluded from calculations. Second, the winding inductance 204 is considered to be infinitely small and allow electric current to freely flow. Under such assumptions, in the equilibrium state, the following relationship exists:

$$V = IR_S + V_g.$$

Because $V_g = nK_E$, wherein $K_E$ is the speed equation constant, the steady speed:

$$n = \frac{V - IR_S}{K_E}$$

In other words, when the motor 210 operates under certain loading conditions (i.e., against a constant resistant torque load), the steady rotation speed is determined by the voltage applied and the resulting operating current. Using this relationship, the control loop of FIG. 1 can determine the voltage and current to achieve a target steady rotation speed of the motor 210. That is, when the speed controller attempts to realize a target rotation speed n, the electric current I can be determined by applying a proper voltage V according to the relationship:

$$I = \frac{V}{R_S} - \frac{nK_E}{R_S}$$

Because n, $K_E$, and $R_S$ are constants, the current I is proportional to the applied voltage V. Furthermore, in a DC motor, the output torque is proportional to the current through its windings. That is, torque $T = Ik_T$, wherein $k_T$ is the torque constant. On the other hand, given a certain voltage, the rotation speed is inversely proportional to the load (i.e., resistant torque) on the motor, i.e., $T = (V - nK_E)k_T/R_S$. Therefore, during operation, when the load on the motor changes, the speed controller adjusts the corresponding voltage to maintain the target rotation speed n. The MCU applies a variable voltage $U_O$ to achieve such adjustment, as discussed below.

Figure 3:
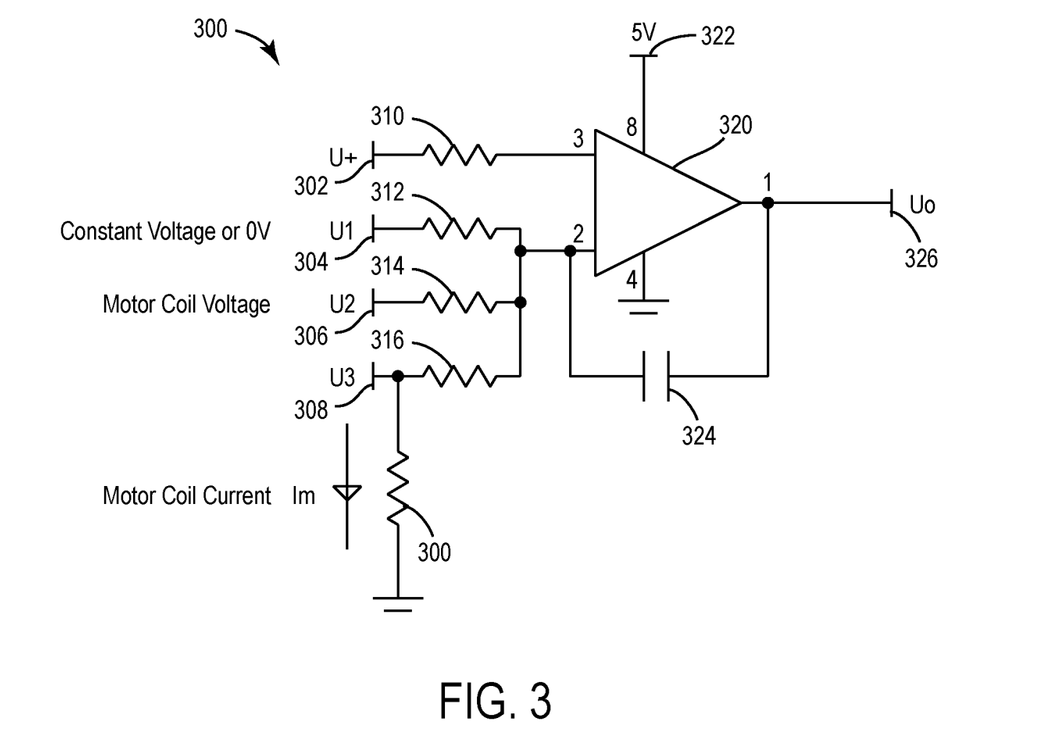
FIG. 3 is a schematic diagram of an amplifier circuit for controlling an electric motor.

FIG. 3 is a schematic diagram of an amplifier circuit 300 for controlling an electric motor. The amplifier circuit 300 includes a base voltage terminal 302 receiving a base voltage $U_+$, a first voltage terminal 304 provided with a constant voltage $U_1$, a second voltage terminal 306 receiving a first motor coil voltage $U_2$, and a third voltage terminal 308 receiving a second motor coil voltage $U_3$. The second motor coil voltage $U_3$ allows for measuring the motor coil current $I_m$ via a sense resistor 318 ($R_{Sense}$), for example. In this example, the output voltage $U_O$ will be supplied to the electric motor. The following relationship exists:

$$U_O = U_+ + \frac{U_+}{C_F}\int\left(\frac{1}{R_1}+\frac{1}{R_2}+\frac{1}{R_3}\right)dt - \frac{1}{C_F}\int\left(\frac{U_1}{R_1}+\frac{U_2}{R_2}+\frac{U_3}{R_3}\right)dt$$

wherein $C_F$ is a value of a capacitor 324 in the amplifier integrator circuit and $R_1$, $R_2$, and $R_3$ are values of respective resistors 314-316 between the first voltage terminal, the second voltage terminal and the third voltage terminal and the amplifier integrator circuit. The amplifier circuit 300 is further shown to include a base terminal resistor 310.

In some embodiments, the amplifier integrator circuit includes an operational amplifier 320, such as LM2904 or a similar operational amplifier, such as, for example, LM2904V, LM358A, etc. The operational amplifier 320 may be connected to other portions of the MCU, such as a power supply 322, the capacitor 324, and a ground.

An output voltage $U_O$ (e.g., provided by an output voltage terminal 326) can thus be controlled by controlling the values for $U_+$, $U_1$, $U_2$, and $U_3$. In each control cycle, there are four discrete control stages having different values (in V) for $U_+$, $U_1$, $U_2$, and $U_3$ as shown in Table 1 below. For example, the constant voltage for $U_1$ may be set at 5 V. Depending on different applications for other purposes, different constant voltage may be provided to $U_1$. Similarly, although Table 1 provides that $U_+$ is 0.5 V during t and $t_3$, in other embodiments, $U_+$ may have a different value during $t_1$ and $t_3$, for example, at 0.6 or 0.7 V.

TABLE 1

Input voltages for amplifier circuit in one control cycle.

| Stage | U+ | U1 | U2 | U3 |
|---|---|---|---|---|
| $t_0$ | 0 | Constant | Variable >0 | 0 |
| $t_1$ | 0.5 | Constant | 0 | 0 |
| $t_2$ | 0 | Constant | 0 | Variable >0 |
| $t_3$ | 0.5 | Constant | 0 | 0 |

Figure 4:
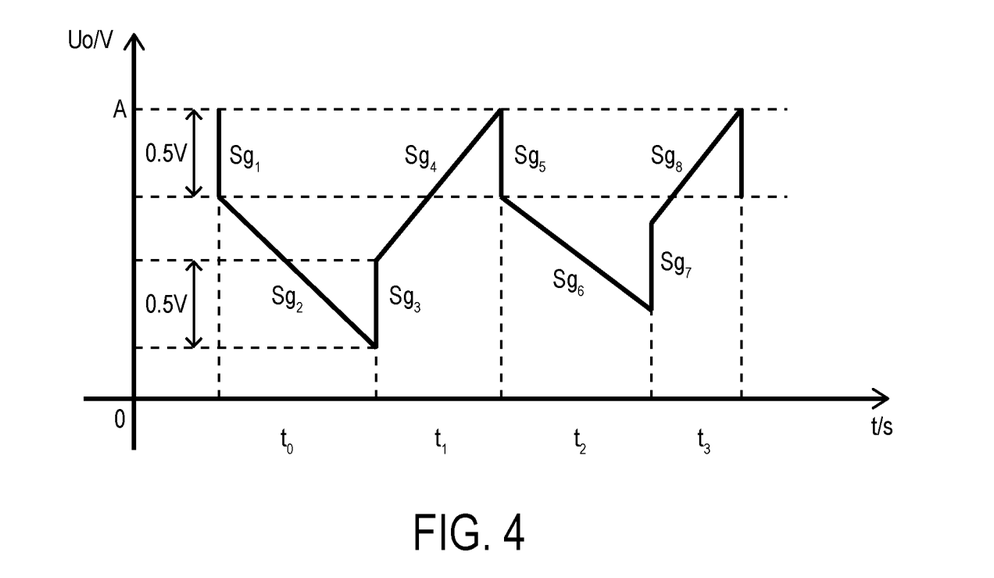
FIG. 4 is a graph illustrating the output voltage of the amplifier circuit shown in FIG. 3.

FIG. 4 illustrates the output voltage $U_O$ of the amplifier circuit shown in FIG. 3. In each control cycle, the output voltage $U_O$ behaves in eight stages Sg1, Sg2, Sg3, Sg4, Sg5, Sg6, Sg7, and Sg8 as shown. Sg1 through Sg4 are in a first control time period, during which $U_3$ is set at zero, thus turning off the motor coil current $I_m$ and allowing the MCU to measure the effective voltage received by the motor. Sg5 through Sg8 are in a second control time period, during which $U_2$ is set at zero, thus enabling the measurement of the motor coil current $I_m$. Sg1, Sg3, Sg5, and Sg7 are instant changes in $U_O$ caused by the change of the base voltage $U_+$.

The behavior of the output voltage in the stages Sg2, Sg4, Sg6, and Sg8 can be expressed by removing the zero terms according to the values shown in Table 1, as summarized below:

$$U_O = -\frac{1}{C_F}\int\left(\frac{U_1}{R_1}+\frac{U_2}{R_2}\right)dt_0 \quad \text{Sg2}$$

$$U_O = \frac{U_+}{C_F}\int\left(\frac{1}{R_1}+\frac{1}{R_2}+\frac{1}{R_3}\right)dt_1 - \frac{1}{C_F}\int\frac{U_1}{R_1}dt_1 \quad \text{Sg4}$$

$$U_O = -\frac{1}{C_F}\int\left(\frac{U_1}{R_1}+\frac{U_3}{R_3}\right)dt_2 \quad \text{Sg6}$$

$$U_O = \frac{U_+}{C_F}\int\left(\frac{1}{R_1}+\frac{1}{R_2}+\frac{1}{R_3}\right)dt_3 - \frac{1}{C_F}\int\frac{U_1}{R_1}dt_3 \quad \text{Sg8}$$

The MCU controls the constant and variable values for U1, U2, and U3 to realize the following conditions. First, by controlling values of $U_1$, $U_2$, $t_0$ and $t_1$, the MCU can cause the voltage change in terms of magnitude during Sg2 to be the same as the voltage change in magnitude during Sg4. That is, the following relationship will be realized.

$$-\frac{1}{C_F}\int\left(\frac{U_1}{R_1}+\frac{U_2}{R_2}\right)dt_0 = \frac{U_+}{C_F}\int\left(\frac{1}{R_1}+\frac{1}{R_2}+\frac{1}{R_3}\right)dt_1 - \frac{1}{C_F}\int\frac{U_1}{R_1}dt_1$$

Similarly, by controlling values of $U_1$, $U_3$, $t_2$ and $t_3$, the MCU can cause the voltage change in terms of magnitude during Sg6 to be the same as the voltage change in magnitude during Sg8. As such, the following relationship will be realized.

$$-\frac{1}{C_F}\int\left(\frac{U_1}{R_1}+\frac{U_3}{R_3}\right)dt_2 = \frac{U_+}{C_F}\int\left(\frac{1}{R_1}+\frac{1}{R_2}+\frac{1}{R_3}\right)dt_3 - \frac{1}{C_F}\int\frac{U_1}{R_1}dt_3$$

Second, the MCU makes $t_0$ equal to $t_2$. That is, the first time difference $t_0$ between the first control period $T_1$ and the first time period $t_1$ is the same as the second time difference $t_2$ between the second control period $T_2$ and the second time period $t_3$. As a result, the following relationship exists.

$$\left(\frac{U_2}{R_2}-\frac{U_3}{R_3}\right)t_0 = \left[U_+\left(\frac{1}{R_1}+\frac{1}{R_2}+\frac{1}{R_3}\right)-\frac{U_1}{R_1}\right](t_1-t_3)$$

Because $U_3 = I_m R_{Sense}$ and $$n = \frac{U_2 - I_m R_S}{K_E},$$

the rotation speed n can further be expressed as:

$$n = \frac{R_2}{t_0 K_E}\left[U_+\left(\frac{1}{R_1}+\frac{1}{R_2}+\frac{1}{R_3}\right)-\frac{U_1}{R_1}\right](t_1-t_3) + \frac{I_m}{K_E}\left(\frac{R_2 R_{Sense}}{R_3}-R_s\right)$$

Third, by design, the product of $R_S$ and $R_3$ is equal to the product of $R_2$ and $R_{Sense}$, i.e., to satisfy the following relationship.

$$R_s = \frac{R_2 R_{Sense}}{R_3}$$

The resulting motor speed n is then determined by the only variables $t_1$ and $t_3$, while other parameters remain constants, following the relationship below.

$$n = \frac{R_2}{t_0 K_E}\left[U_+\left(\frac{1}{R_1}+\frac{1}{R_2}+\frac{1}{R_3}\right)-\frac{U_1}{R_1}\right](t_1-t_3)$$

Therefore, the rotation speed n of the motor is proportional to the value difference between $t_3$ and $t_1$.

During operation, the MCU adjusts $t_1$ and $t_3$ to maintain a target operation speed. For example, if the load on the motor increases, the output voltage drops rapidly during Sg6 at a greater gradient. Because $t_0$ and $t_2$ are kept at a constant value (e.g., 12 ms), Sg8 will start at a decreased voltage and will take a longer time period $t_3$ to reach the operating voltage level (e.g., 5 V). Consequently, the MCU will increase $t_1$ in order to maintain a value difference of $(t_1-t_3)$ to maintain the target motor speed. This increase is achieved by an increase of effective (e.g., PWM average) motor coil voltage applied to the motor. The operation periods $T_1$ and $T_2$ change in accordance with the changes in $t_1$ and $t_3$ when $t_0$ and $t_2$ are maintained constant.

In some embodiments, the MCU includes a timer for measuring $t_3$. For example, at the beginning of Sg8, the MCU receives a trigger signal. Similarly, at the beginning of Sg1, the MCU receives another trigger signal for completing the instant $t_3$ measurement. The MCU can similarly measure and control $t_1$.

Figure 5:
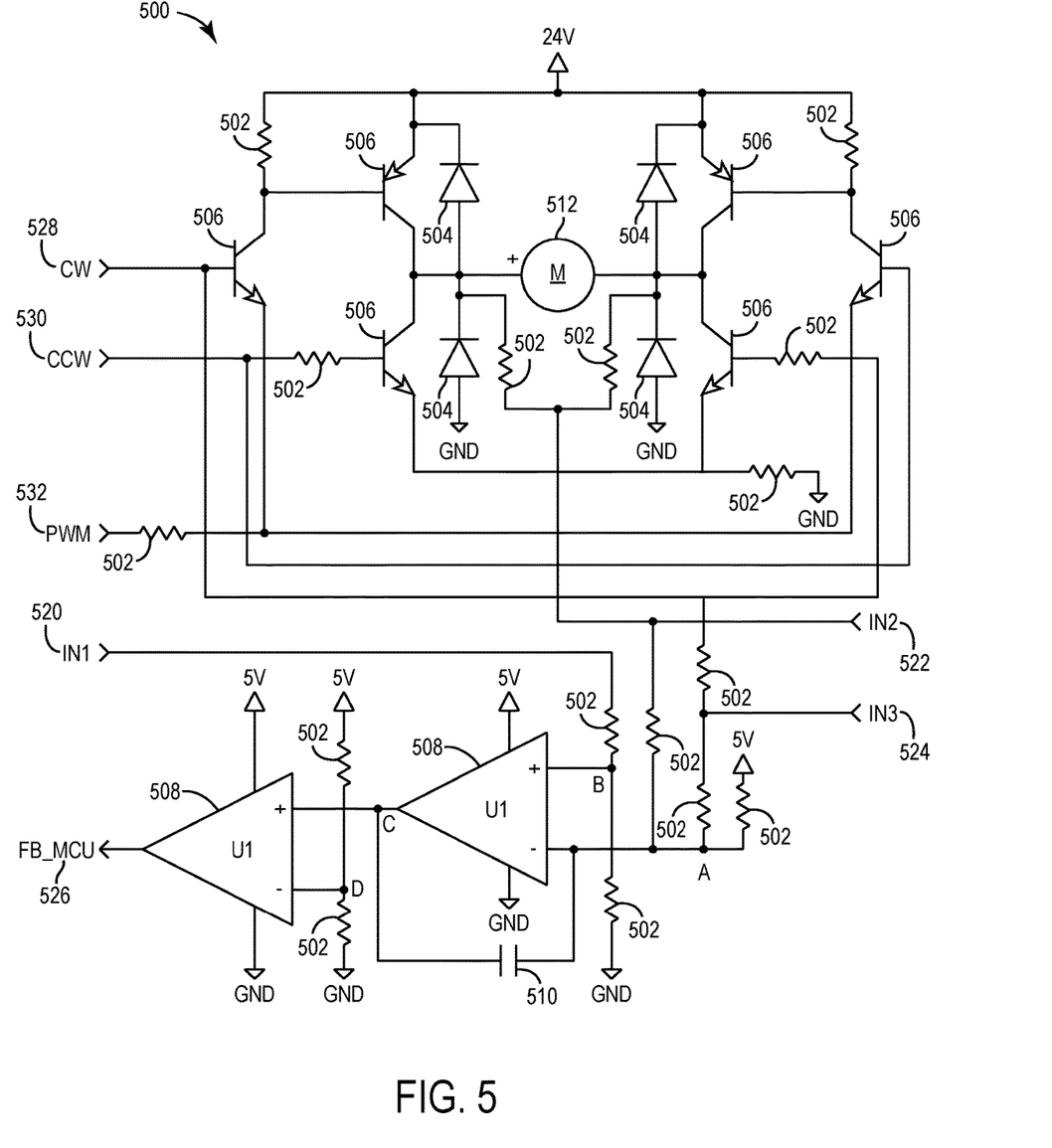
FIG. 5 is an example speed control circuit implementing the speed controller disclosed herein.

FIG. 5 is an example speed control circuit 500 implementing the speed controller disclosed herein. Circuit 500 is shown to include a plurality of resistors 502, diodes 504, transistors 506, and operational amplifiers 508. Circuit 500 is also shown to include a capacitor 510 and a motor 512 (e.g., a DC brush motor). In some embodiments, each of the resistors 502 be a different style of resistor (e.g., metal oxide, film, wire wound, etc.) having a unique set of parameters (e.g., resistance value). Likewise, in some embodiments, each of the diodes 504, the transistors 506, and/or the operational amplifiers 508 may be a unique style having a distinct set of parameters. For example, each of the diodes 504 may have a different forward turn-on voltage. In another example, each of the operational amplifiers 508 may be a similar type of operational amplifier (e.g., LM2904).

In some embodiments, the speed controller or MCU provides input signals IN1, IN2, and IN3 to input terminals 520, 522, and 524, respectively, while it receives feedback signals FB_MCU from an output terminal 526. The voltage at point C corresponds to $U_O$. The MCU timer trigger signal may be sent via point E. Nodes 528, 530, and 532 are also connected to MCU and receive signals CW, CCW, and PWM, respectively. Nodes 528 and 530 allow the MCU to control the rotation direction of the motor. Node 532 allows the MCU to control the effective voltage applied to the DC motor coil.

In some embodiments, the MCU sends command signals and receives feedback signals according to Table 2 below.

TABLE 2

Signals sent and received by MCU during operation

| Time Periods | Stages | IN1 | IN2 | IN3 | FB_MCU |
|---|---|---|---|---|---|
| $t_0$ | Sg1 | 5 V to 0 | Hi-Z | 5 V to 0 | High |
|  | Sg2 | 0 | Hi-Z | 0 | Low |
| $t_1$ | Sg3 | 0 to 5 V | Jump to 0 | 0 | Low |
|  | Sg4 | 5 V | 0 | 0 | Low |
| $t_2$ | Sg5 | 5 V to 0 | 0 | Hi-Z | High |
|  | Sg6 | 0 | 0 | Hi-Z | Low |
| $t_3$ | Sg7 | 0 to 5 V | 0 | Hi-Z | Low |
|  | Sg8 | 5 V | Hi-Z | Jump to 0 | High |

Figure 6:
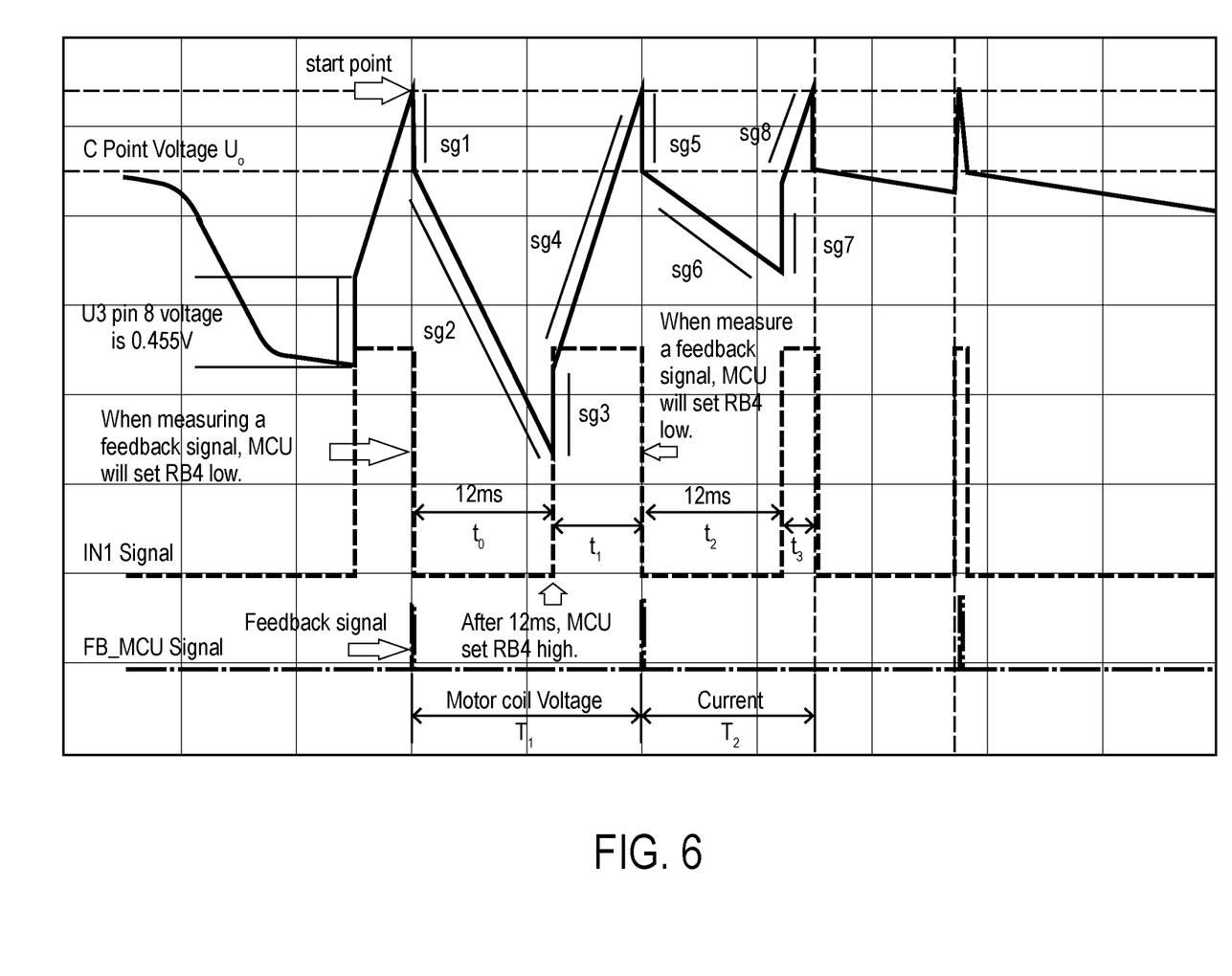
FIG. 6 is a graph illustrating example signals and voltages provided and produced in the example speed control circuit of FIG. 5.

FIG. 6 illustrates example signals and voltages provided and produced in the example speed control circuit of FIG. 5. In particular, FIG. 6 includes input signals IN1 and feedback signal at FB_MCU plotted in the same graph with the output voltage $U_O$ during one control cycle. In this illustrated example, the time periods $t_0$ and $t_2$ are kept at 12 ms, while the difference between $t_1$ and $t_3$ is kept at 5 ms.

Although the figures show a specific arrangement of components, integrated circuits, and supplied signals, the disclosed speed controller may be modified to realize similar functions and characteristics using different arrangement of components, alternative integrated circuits, and modified supplied signals.

What is claimed is:

1. A speed controller for determining and controlling operation speeds of a motor, the speed controller comprising:
   a processor operable to send control signals and receive feedback signals;
   a base voltage terminal electrically connected to the processor and receiving a base voltage U+;
   a first voltage terminal electrically connected to the processor and provided with a constant voltage;
   a second voltage terminal electrically connected to the processor and receiving a first motor coil voltage $U_2$ determined by the processor; and
   a third voltage terminal electrically connected to the processor and receiving a second motor coil $U_3$ voltage determined by the processor;
   wherein the processor provides a first control period $T_1$ having the second motor coil voltage of the third voltage terminal be zero and a second control period having the first motor coil voltage $U_2$ of the second voltage terminal be zero, and wherein the processor determines a rotation speed of the motor by controlling a value difference between a first time period $t_1$ in the first control period $T_1$ and a second time period $t_3$ in the second control period, the first time period $t_1$ corresponding to a first increase in an output voltage $U_0$ and the second time period $t_3$ corresponding to a second increase in the output voltage $U_0$,
   wherein the output voltage $U_o$, the base voltage $U_+$, constant voltage $U_1$, the first motor coil voltage $U_2$, and the second motor coil voltage $U_3$ satisfy the following relationship:

$$U_O = U_+ + \frac{U_+}{C_F}\int\left(\frac{1}{R_1} + \frac{1}{R_2} + \frac{1}{R_3}\right)dt - \frac{1}{C_F}\int\left(\frac{U_1}{R_1} + \frac{U_2}{R_2} + \frac{U_3}{R_3}\right)dt$$

wherein $C_F$ is a value of a capacitor in an amplifier integrator circuit and $R_1$, $R_2$, and $R_3$ are values of respective resistors between the first voltage terminal, the second voltage terminal and the third voltage terminal and the amplifier integrator circuit.

2. The speed controller of claim 1, wherein the processor receives a feedback signal produced from the output voltage $U_O$.

3. The speed controller of claim 1, wherein a value RS of armature and brush resistance of the motor and a value $R_{Sense}$ of a resistor sensor measuring motor coil current of the motor satisfy the following relationship:

$$R_s = \frac{R_2 R_{Sense}}{R_3}$$

4. The speed controller of claim 3, wherein a first time difference between the first control period $T_1$ and the first time period $t_1$ is the same as a second time difference between the second control period $T_2$ and the second time period $t_3$, the first time difference denoted to and the second time difference denoted $t_2$.

5. The speed controller of claim 4, wherein the rotation speed n of the motor is proportional to a constant value difference between $t_3$ and $t_1$.

6. The speed controller of claim 5, wherein the rotation speed n and the constant value difference between $t_3$ and $t_1$ satisfy the following relationship:

$$n = \frac{R_2}{t_0 K_E}\left[U_+\left(\frac{1}{R_1} + \frac{1}{R_2} + \frac{1}{R_3}\right) - \frac{U_1}{R_1}\right](t_1 - t_3)$$

wherein $K_E$ is a constant of back electromotive force of the motor.

7. The speed controller of claim 6, wherein the base voltage $U_+$ is set at zero, the constant voltage $U_1$ is set at 5 V, the first motor coil voltage $U_2$ is greater than zero, and the second motor coil voltage $U_3$ is set at zero during the first time difference $t_0$.

8. The speed controller of claim 6, wherein the base voltage $U_+$ is set at 0.5 V, the constant voltage $U_1$ is set at 5 V, the first motor coil voltage $U_2$ is set at zero, and the second motor coil voltage $U_3$ is set at zero during the first time period $t_1$.

9. The speed controller of claim 8, wherein the processor sends a command voltage of 5 V to an input terminal IN1 of the speed controller during the first time period $t_1$.

10. The speed controller of claim 6, wherein the base voltage $U_+$ is set at zero, the constant voltage $U_1$ is set at 5 V, the first motor coil voltage $U_2$ is set at zero, and the second motor coil voltage $U_3$ is greater than zero during the second time difference $t_2$.

11. The speed controller of claim 6, wherein the base voltage $U_+$ is set at 0.5 V, the constant voltage $U_1$ is set at 5 V, the first motor coil voltage $U_2$ is set at zero, and the second motor coil voltage $U_3$ is set at zero during the second time period $t_3$.

12. The speed controller of claim 11, wherein the processor sends a command voltage of 5 V to an input terminal IN1 of the speed controller during the second time period $t_3$.

13. The speed controller of claim 1, wherein the motor is a brushed direct current motor and the processor provides a pulse width modulation signal to drive the motor.

14. An actuator control system for use with a motor operable to move an actuator, the actuator control system comprising:
a speed controller configured to determine and control a speed of the motor, wherein the speed controller comprises:
a processor configured to send control signals and receive feedback signals; and
an interface configured to receive a base voltage U+, provide a constant voltage,
receive a first motor coil voltage $U_2$, and
receive a second motor coil voltage $U_3$ ;
wherein the processor is configured to provide a first control period $T_1$ having the second motor coil voltage $U_3$ be zero and a second control period having the first motor coil voltage be zero, and wherein the processor in configured to determine the speed of the motor by maintaining a constant value difference between a first time period $t_1$ in the first control period $T_1$ and a second time period t3 in the second control period, the first time period $t_1$ corresponding to a first increase in an output voltage $U_O$ and the second time period $t_3$ corresponding to a second increase in the output voltage $U_O$,
wherein the output voltage $U_o$, the base voltage $U_+$, constant voltage $U_1$, the first motor coil voltage $U_2$, and the second motor coil voltage $U_3$ satisfy the following relationship:

$$U_O = U_+ + \frac{U_+}{C_F}\int\left(\frac{1}{R_1} + \frac{1}{R_2} + \frac{1}{R_3}\right)dt - \frac{1}{C_F}\int\left(\frac{U_1}{R_1} + \frac{U_2}{R_2} + \frac{U_3}{R_3}\right)dt$$

wherein $C_F$ is a value of a capacitor in an amplifier integrator circuit and $R_1$, $R_2$, and $R_3$ are values of respective resistors between first voltage terminal, second voltage terminal and third voltage terminal and the amplifier integrator circuit, and wherein the motor is a direct current brush motor and the processor is configured to provide a pulse width modulation signal to drive the motor.

15. The actuator control system of claim 14, wherein the processor comprises an integrator circuit and a comparator circuit, and the processor is configured to receive a feedback signal produced from the output voltage $U_O$.

16. The actuator control system of claim 14, wherein a value RS of armature and brush resistance of the motor and a value $R_{Sense}$ of a resistor sensor measuring motor coil current of the motor satisfy the following relationship:

$$R_s = \frac{R_2 R_{Sense}}{R_3}$$

17. The actuator control system of claim 16, wherein a first time difference between the first control period $T_1$ and the first time period $t_1$ is the same as a second time difference between the second control period $T_2$ and the second time period $t_3$, the first time difference denoted $t_0$ and the second time difference denoted $t_2$; and wherein rotation speed n of the motor is proportional to the constant value difference between $t_3$ and $t_1$.

* * * * *